(12) United States Patent
Kumagai et al.

(10) Patent No.: US 7,533,269 B2
(45) Date of Patent: May 12, 2009

(54) DIGITAL-SIGNED DIGITAL DOCUMENT EXCHANGE SUPPORTING METHOD AND INFORMATION PROCESSOR

(75) Inventors: Yoko Kumagai, Tokyo (JP); Takahiro Fujishiro, Yokohama (JP); Tadashi Kaji, Yokohama (JP); Shingo Hane, Yokohama (JP); Hitoshi Shimonosono, Funabashi (JP)

(73) Assignee: Hitachi, Ltd., Tokyo (JP)

( * ) Notice: Subject to any disclaimer, the term of this patent is extended or adjusted under 35 U.S.C. 154(b) by 836 days.

(21) Appl. No.: 11/045,133

(22) Filed: Jan. 31, 2005

(65) Prior Publication Data

US 2006/0168650 A1 Jul. 27, 2006

(30) Foreign Application Priority Data

Nov. 29, 2004 (JP) .............................. 2004-344236

(51) Int. Cl.
*H04L 9/00* (2006.01)
(52) U.S. Cl. ......................................... 713/176; 726/32
(58) Field of Classification Search ................ 382/100; 705/35; 713/176; 726/32
See application file for complete search history.

(56) References Cited

U.S. PATENT DOCUMENTS 5,848,400 A * 12/1998 Chang .......................... 705/35
6,567,530 B1 * 5/2003 Keronen et al. ............. 382/100

6,990,585 B2 * 1/2006 Maruyama et al. .......... 713/176

(Continued)

FOREIGN PATENT DOCUMENTS

EP 1094424 4/2001

(Continued)

OTHER PUBLICATIONS

Comparing WSPL and WS-Policy; Anne Anderson, Jun. 2004, Sun Microsystem, pp. 1-30.*

(Continued)

*Primary Examiner*—Kambiz Zand
*Assistant Examiner*—Monjour Rahim
(74) *Attorney, Agent, or Firm*—Antonelli, Terry, Stout & Kraus, LLP.

(57) ABSTRACT

In response to a sign request including a digital document from a document-creating device 10, a digital-signed-document exchange supporting server 30 canonicalizes the digital document, calculates a digest value thereof, and returns the digest value to the document creating device. When the document-creating device transmits a digital sign created by encrypting the digest value to the digital-signed-digital document exchange-supporting server 30, the server 30 creates a digital-signed document from the digital sign and the digital document, and returns the document to the document-creating device. On the other hand, in response to a validation request including a digital-signed-digital document and a public key from a sign validating device 20, the server 30 compares a value resulting from the decryption of the digital sign with the public key and a digest value of the digital document canonicalized and returns the result to the sign validating device.

9 Claims, 9 Drawing Sheets

U.S. PATENT DOCUMENTS

| | | | |
|---|---|---|---|
| 7,206,432 B2 * | 4/2007 | Iwamura | 382/100 |
| 7,231,522 B2 * | 6/2007 | Murakami et al. | 713/176 |
| 7,287,284 B2 * | 10/2007 | Hayashi | 726/32 |
| 2002/0049906 A1 * | 4/2002 | Maruyama et al. | 713/176 |
| 2003/0093678 A1 | 5/2003 | Bowe et al. | |
| 2004/0148508 A1 * | 7/2004 | Alev et al. | 713/180 |
| 2005/0091500 A1 * | 4/2005 | Okazaki | 713/176 |
| 2006/0265593 A1 * | 11/2006 | Momma et al. | 713/176 |
| 2007/0022293 A1 * | 1/2007 | Hayashi et al. | 713/176 |

FOREIGN PATENT DOCUMENTS

| | | |
|---|---|---|
| WO | WO 00/25246 | 5/2000 |

OTHER PUBLICATIONS

Boyer, John, "Canonical XML Version 1.0, W3C Recommendation Mar. 15, 2001", [online], Mar. 15, 2001, [searched on Jul. 20, 2004], Canonical XML on Web page, URL: http://www.w3.org/TR/xml-c14n.

Boyer, John and et al 2, "Exclusive XML Canonicalization Version 1.0, W3C Recommendation Jul. 18, 2002.", [online[, Jul. 18, 2002, [searched on Jul. 20, 2004], Exclusive XML Canonicalization on Web page, URL:http://www.w3.org/TR/xml-exc-c14n/.

Entrust: "Web Services Trust and XML Security Standards", Apr. 9, 2001.

* cited by examiner

| 321A₁ CREATED DATES | 321A₂ SIGNED BY | 321A₃ DIGITAL-SIGNED DOCUMENTS |
|---|---|---|
| 2004/07/20 12:25:20 | xxxxx | SIGNED DOCUMENT 1 |
| 2004/07/24 15:30:45 | xxxxx | SIGNED DOCUMENT 2 |
| 2004/08/08 08:20:12 | xxxxx | SIGNED DOCUMENT 3 |

FIG.7

| SIGN VALIDATED DATES | SIGN VALIDATION RESULTS | CERTIFICATE VALIDATED DATES | CERTIFICATE VALIDATION RESULTS | VALIDATED BY | VALIDATION REQUESTS | |
|---|---|---|---|---|---|---|
| 321B$_1$ | 321B$_2$ | 321B$_3$ | 321B$_4$ | 321B$_5$ | 321B$_6$ | |
| 2004/07/21 12:32:20 | OK | 2004/07/21 12:32:25 | OK | xxxxx | SIGNED DOCUMENT 1 | CERTIFICATE 1 |
| 2004/07/25 15:23:45 | NG | — | — | xxxxx | SIGNED DOCUMENT 2 | CERTIFICATE 2 |
| 2004/08/09 09:10:12 | OK | 2004/08/09 09:10:17 | NG | xxxxx | SIGNED DOCUMENT 3 | CERTIFICATE 3 |

DIGITAL-SIGNED DIGITAL DOCUMENT EXCHANGE SUPPORTING METHOD AND INFORMATION PROCESSOR

INCORPORATION BY REFERENCE

This application claims priority based on a Japanese patent application, No. 2004-344236 filed on Nov. 29, 2004, the entire contents of which are incorporated herein by reference.

BACKGROUND OF THE INVENTION

The present invention relates to a technology for supporting creation and validation of a digital sign for a digital document to be canonicalized before adding and validating the digital sign.

In order to prevent disguises and falsifications, a digital sign may be often attached to a digital document described in Extensible Markup Language (XML) (called XML document, hereinafter) in a transmitting information processor having created the XML document (called document creating device, hereinafter). The digital sign is created by encrypting, with a private key of the document creating device, a message digest value (hash value) of an XML document to be signed.

On the other hand, an information processor having received the XML document with the digital sign (called sign validating device, hereinafter) calculates a message digest value of the XML document to be signed, decrypts the digital sign with a public key of the document creating device and compares the results of both of them so that the validity of the XML document can be confirmed.

Incidentally, the sign validating device fails in validating an XML document since even a change in numbers of blanks and line breaks while the XML document with the digital sign is being transmitted changes the digest value of the XML document. Therefore, when a sign is added to an XML document and the sign of the XML document is validated, both of the document creating device and sign validating device perform processing for canonicalizing the XML document before the calculation of a digest value thereof. The canonicalizing processing is being standardized by World Wide Web Consortium (W3C). For example, Boyer, John, "Canonical XML Version 1.0, W3C Recommendation 15 Mar. 2001", [online], 15 Mar. 2001, [searched on 20 Jul. 2004], Canonical XML on Web page, URL:http://www.w3.org/TR/xml-c14n (hereinafter, referred to as Document 1) and Boyer, John and et al 2, "Exclusive XML Canonicalization Version 1.0, W3C Recommendation 18 Jul. 2002.", [online], 18 Jul. 2002, [searched on 20 Jul. 2004], Exclusive XML Canonicalization on Web page, URL:http://www.w3.org/TR/xml-exc-c14n/ (hereinafter, referred to as Document 2) are publicly available as standard specifications.

SUMMARY OF THE INVENTION

However, although the above conventional standard specifications are publicly available, different implementers (such as vendors) may interpret the conventional, publicly available standard specifications differently, for example, which may differentiate methods of implementing processing for canonicalizing an XML document. Thus, when canonicalization results are different between the document creating device and the sign validating device, the validation of an XML sign may be failed though the XML document is not falsified.

Accordingly, it is an object of the invention to prevent a disagreement between a result of canonicalizing processing to be performed before creating a digital sign and a result of canonicalizing processing to be performed before validating the digital sign for the document to undergo canonicalizing processing before both of the creation and validation of the digital sign.

According to the invention, there is provided an information processor which supports an exchange of a digital-signed digital document, the processor including:

a communication means which is connected to a network; and a processing means which, when the communication means receives a sign request including a first digital document from a first computer on the network, canonicalizes the first digital document by canonicalizing processing, calculates a digest value of the canonicalized first digital document and causes the communication means to output the digest value to the first computer, wherein, when the communication means receives a digital sign created by the first computer by encrypting the digest value, the processing means creates the first digital document with the digital sign from the digital sign and the first digital document and causes the communication means to output the first digital document with the digital sign to the first computer.

In the information processor, when the communication means receives a validation request including a public key for validating a second digital document with a digital sign and the digital sign from a second computer on the network, the processing means compares a value obtained by decrypting the digital sign with the public key and a digest value of the second digital document canonicalized by the canonicalizing processing and causes the communication means to output the result of the comparison to the second computer.

According to the invention, a disagreement can be prevented between a result of canonicalizing processing to be performed before creating a sign and a result of canonicalizing processing to be performed before validating the sign for a digital document to undergo canonicalizing processing before both of the creation and validation of the sign.

These and other benefits are described throughout the present specification. A further understanding of the nature and advantages of the invention may be realized by reference to the remaining portions of the specification and the attached drawings.

DETAILED DESCRIPTION OF THE EMBODIMENTS

An embodiment of the invention will be described below with reference to attached drawings.

First of all, a schematic configuration of a digital-signed-document exchanging system according to this embodiment will be described. Here, an XML document is used as an example of a document to undergo canonicalizing processing before both of the creation and validation of a sign thereof.

Figure 1:
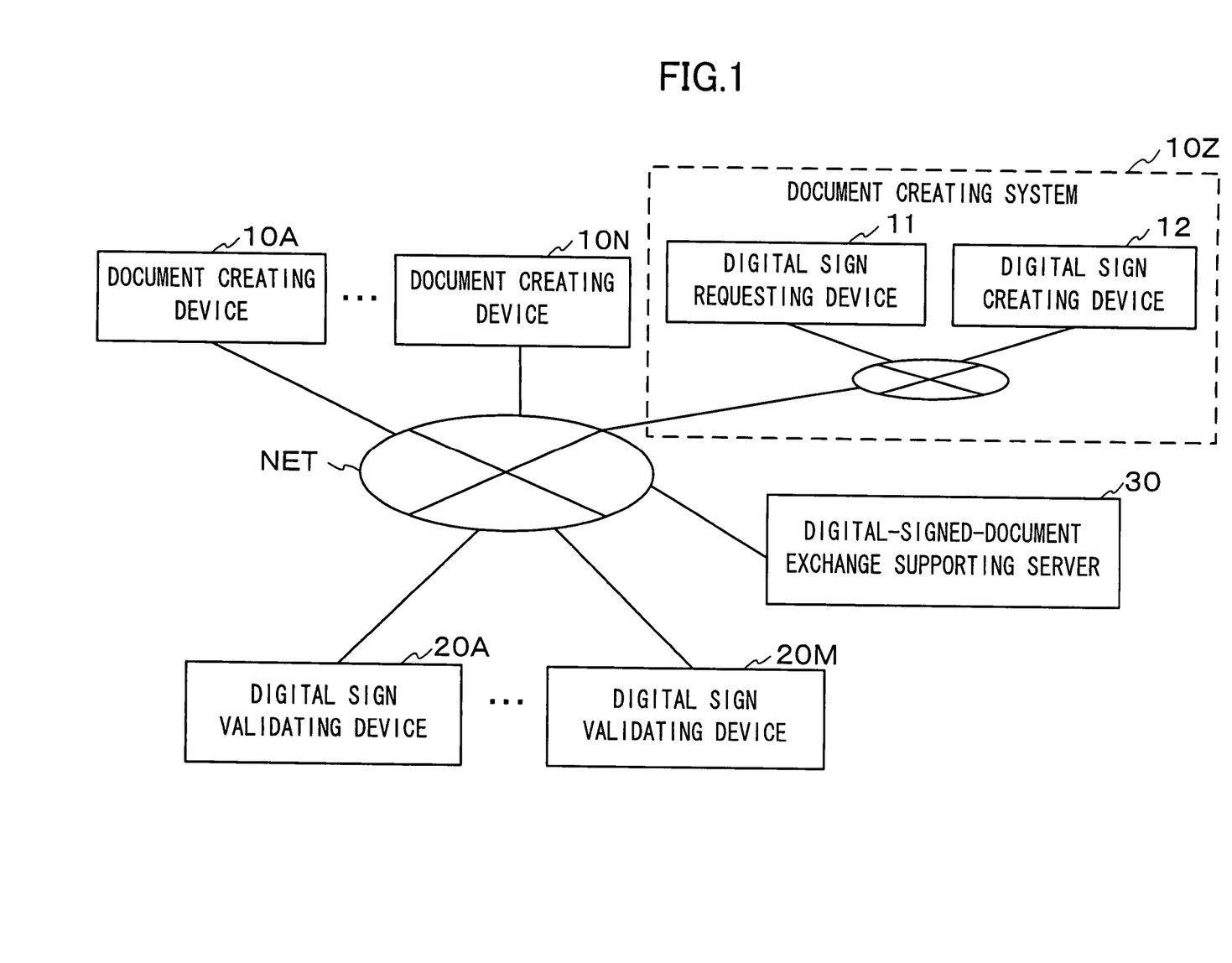
FIG. 1 is a schematic configuration diagram of a digital-signed-document exchanging system according to an embodiment of the invention.

As shown in FIG. 1, the digital-signed-document exchanging system according to this embodiment has multiple information processors (document creating devices 10A to 10N and document validating devices 20A to 20M) which exchange a digital-signed XML document (called digital-signed document, hereinafter), an information processor (digital-signed-document exchange supporting server) 30 which performs processing for canonicalizing an XML document before adding and validating a sign thereof and a network (such as the Internet) 14 which connects the information processors with each other.

Figure 2:
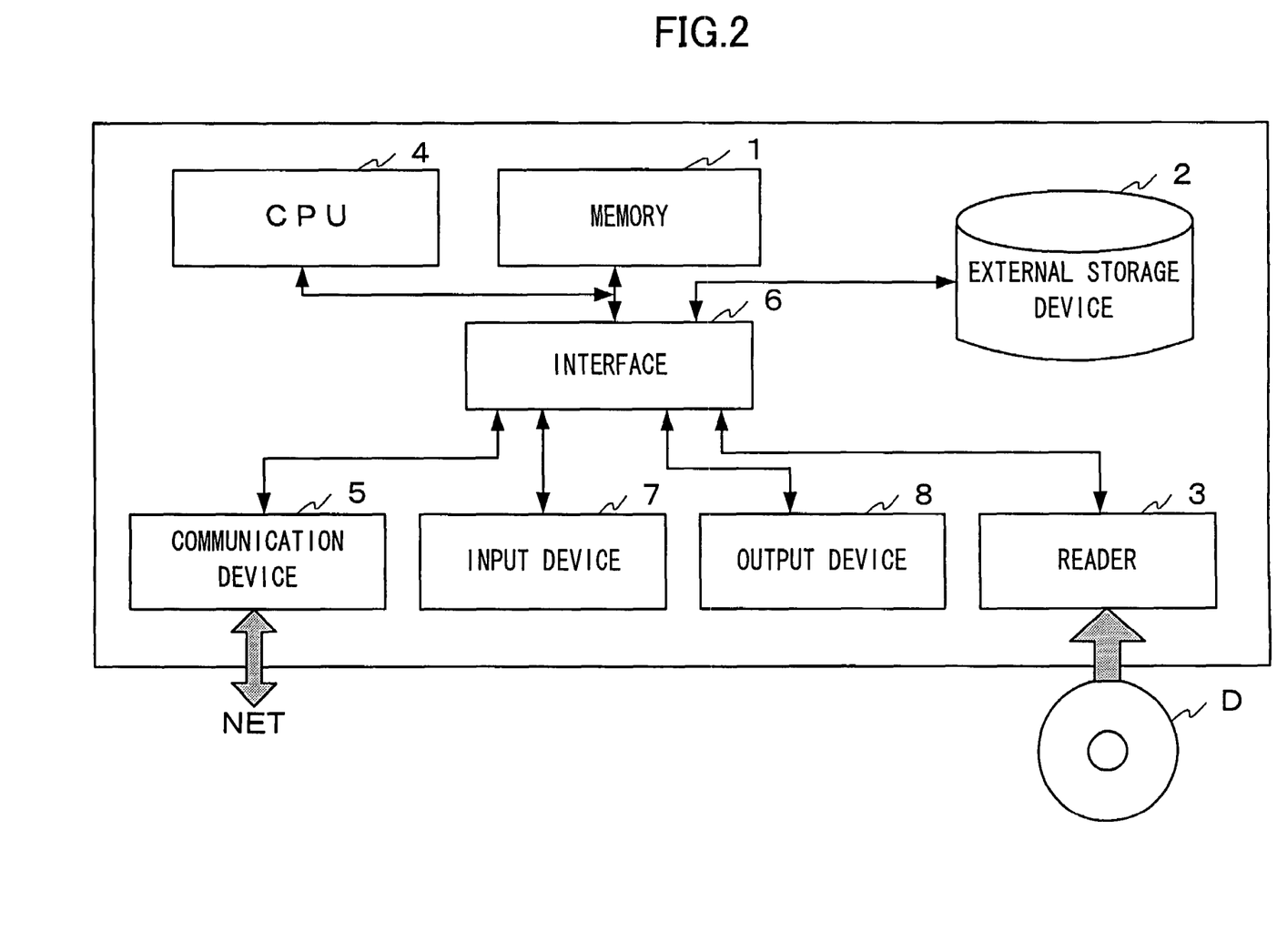
FIG. 2 is a hardware configuration diagram of an information processor included in the digital-signed-document exchanging system in FIG. 1.

As shown in FIG. 2, each of the information processors included in the digital-signed-document exchanging system has a memory 1, an external storage device (such as a hard disk) 2 in which a program for implementing a requested function is installed, a reader 3 which can read information from a portable storage medium (such as an optical disk) D, a CPU 4 which executes a program loaded from the external storage device 2 or portable storage medium D to the memory 1, a communication device 5 which controls communication via a network NET, an interface 6 to which an external device is connected, and a bus which connects these components with each other. Here, the external device to be connected to the interface 6 may be an input device (such as a keyboard and a mouse) 7 which receives an input from a user or an output device (such as a monitor and a printer) 8 which outputs information to be provided to a user, for example. The program on the external storage device 53 may be installed from the storage medium D through the reader 3 or may be downloaded from another information processor on the network NET through the communication apparatus 5.

By executing a program in a hardware configuration, each of the information processors implements a functional configuration as at least one kind of device among the document creating devices 10A to 10N, document validating devices 20A to 20M and the digital-signed-document exchange supporting server 30. More specific details will be described below.

Figure 3:
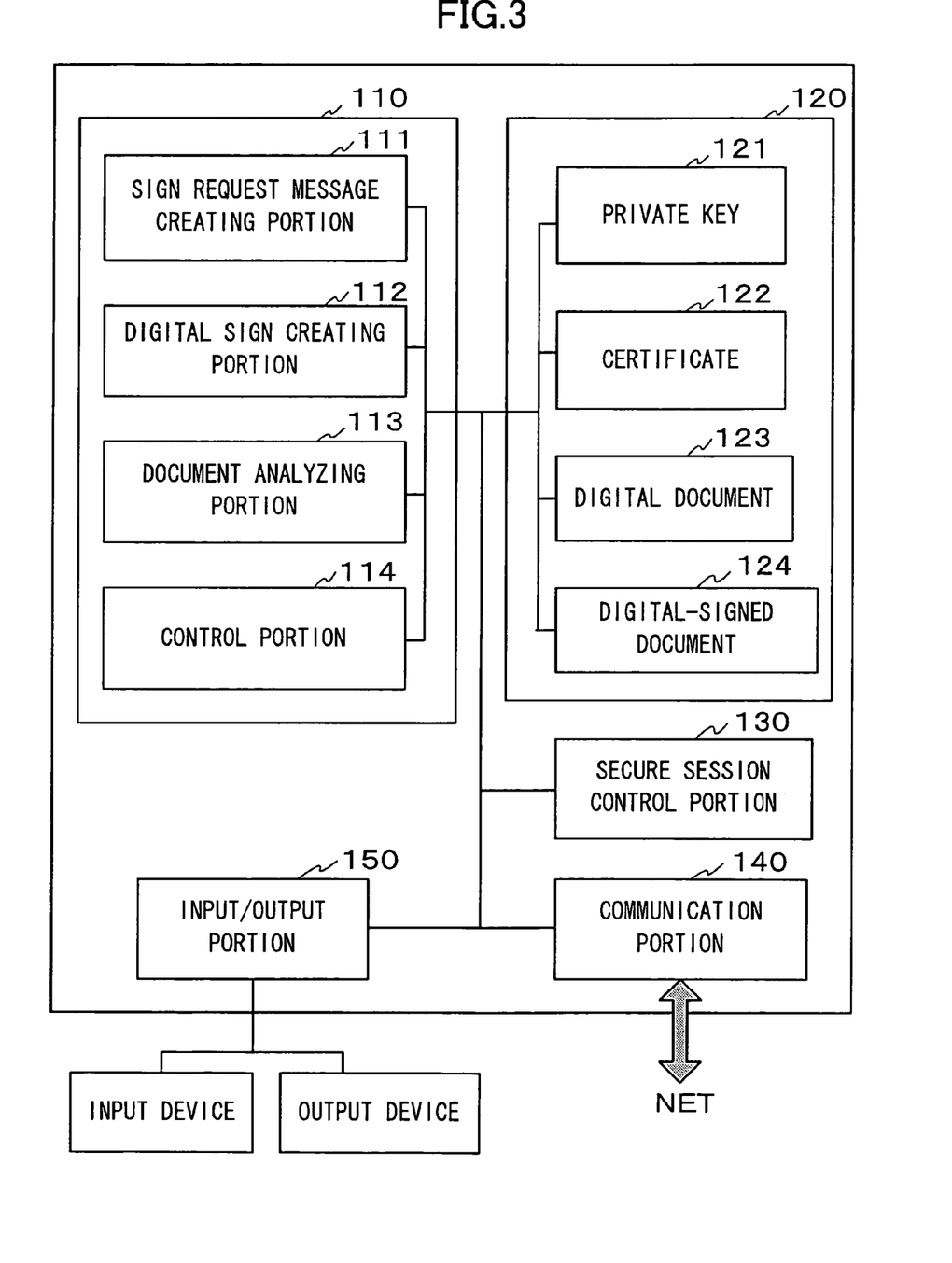
FIG. 3 is a functional configuration diagram of a document creating device included in the digital-signed-document exchanging system in FIG. 1.

FIG. 3 is a functional configuration diagram of each of the document creating devices 10A to 10N.

Each of the document creating devices 10A to 10N implements a storage portion 120, a processing portion 110, a communication portion 140, a secure session control portion 130, and an input/output portion 150. The storage portion 120 stores information required for adding a digital sign. The processing portion 110 performs processing for creating a digital-signed document, which will be described later, by using information within the storage portion 120. The communication portion 140 communicates with another information processor via the network NET. The secure session control portion 130 performs processing (such as authentication and encryption of a communication path) for securing the security of data to be exchanged with another information processor on the network. The input/output portion 150 controls an input device and an output device. The processing portion 110 includes a sign requesting message creating portion 111, a digital sign creating portion 112, a document analyzing portion 113 and a control portion 114. The sign requesting message creating portion 111 creates a sign requesting message to the digital-signed-document exchange supporting server 30. The digital sign creating portion 112 encrypts, with a private key, a hash value created by the digital-signed-document exchange supporting server 30. The document analyzing portion 113 analyzes an XML document for displaying data of a digital-signed document, for example. The control portion 114 controls these components.

The storage portion 120 pre-stores a private key 121 to be used for creating a digital sign and a public key certificate 122 including a public key corresponding to the private key 121. The storage portion 120 further stores a digital document 123 to be digital signed and a digital-signed document 124 created by the digital-signed-document exchange supporting server 30.

Under this functional configuration, each of the document creating devices 10A to 10N can request the digital-signed-document exchange supporting server 30 to add digital sign to a digital document created by a user in accordance with a command from a user.

Figure 4:
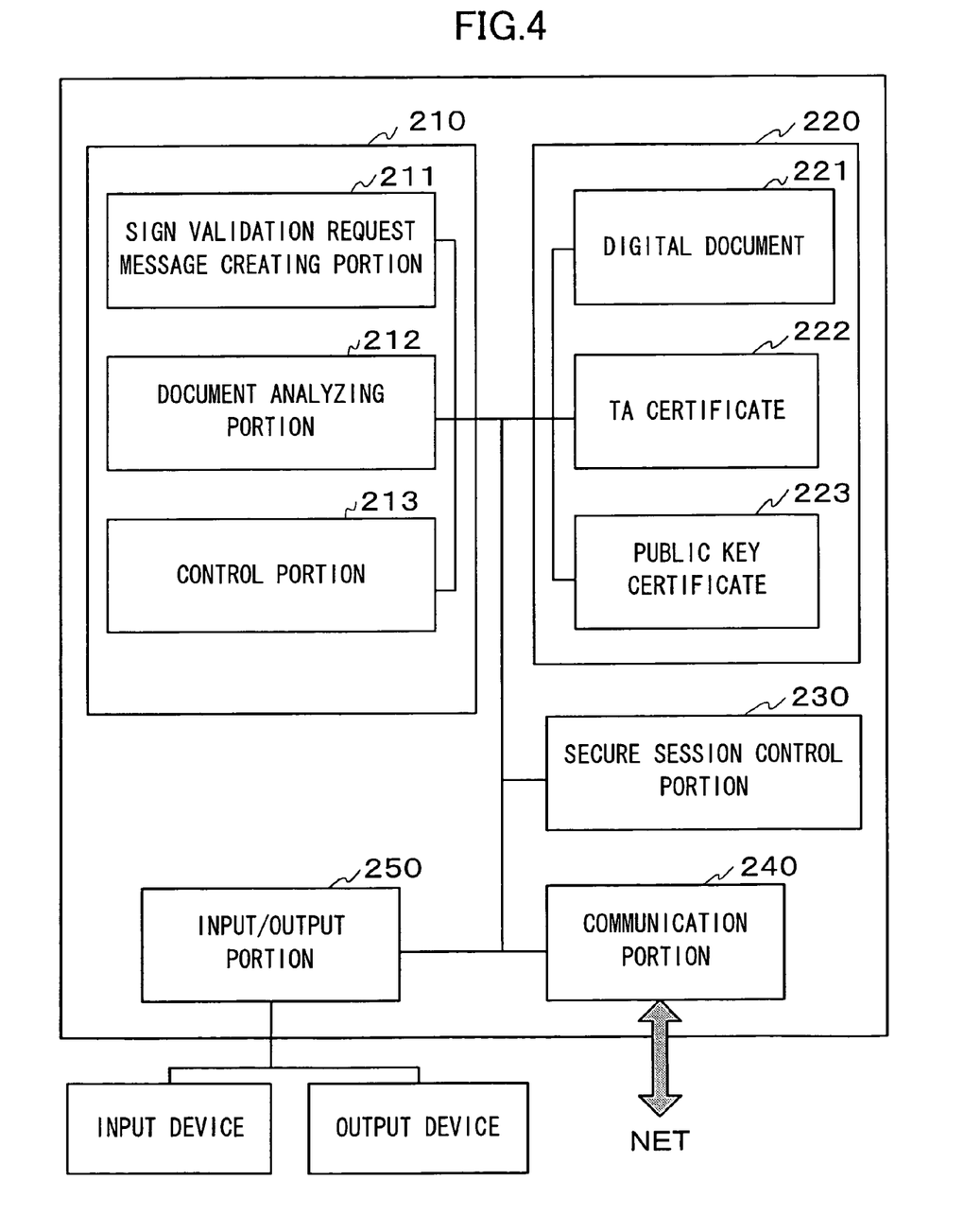
FIG. 4 is a functional configuration diagram of a sign validating device included in the digital-signed-document exchanging system in FIG. 1.

FIG. 4 is a functional configuration diagram of each of the sign validating devices 20A to 20M.

Each of the sign validating devices 20A to 20M has a storage portion 220, a processing portion 210, a communication portion 240, a secure session control portion 230 and an input/output portion 250. The storage portion 220 pre-stores a self-sign certificate (called TA certificate) 222 issued from a valid certificate authority. The communication portion 240 communicates with another information processor via the network NET. The secure session control portion 230 performs processing (such as machine authentication and encryption of a communication path) for securing the security of data to be exchanged with another information on the network. The input/output portion 250 controls an input device and an output device.

The processing portion 210 includes a sign validation requesting message creating portion 211, a document analyzing portion 212 and a control portion 213. The sign validation requesting message creating portion 211 creates a sign validation requesting message to the digital-signed-document exchange supporting server 30. The document analyzing portion 212 analyzes an XML document for displaying contents of a digital-signed document, for example, received from a document creating device. The control portion 213 controls these components. The storage portion 220 also stores a digital-signed document 221 and public key certificate 223 attached thereto from one of the document creating devices.

Under this functional configuration, each of the sign validating devices 20A to 20N can request the digital-signed-document exchange supporting server 30 to digital validate a digital-signed document received from one of the document creating devices, for example, in accordance with a command from a user.

Figure 5:
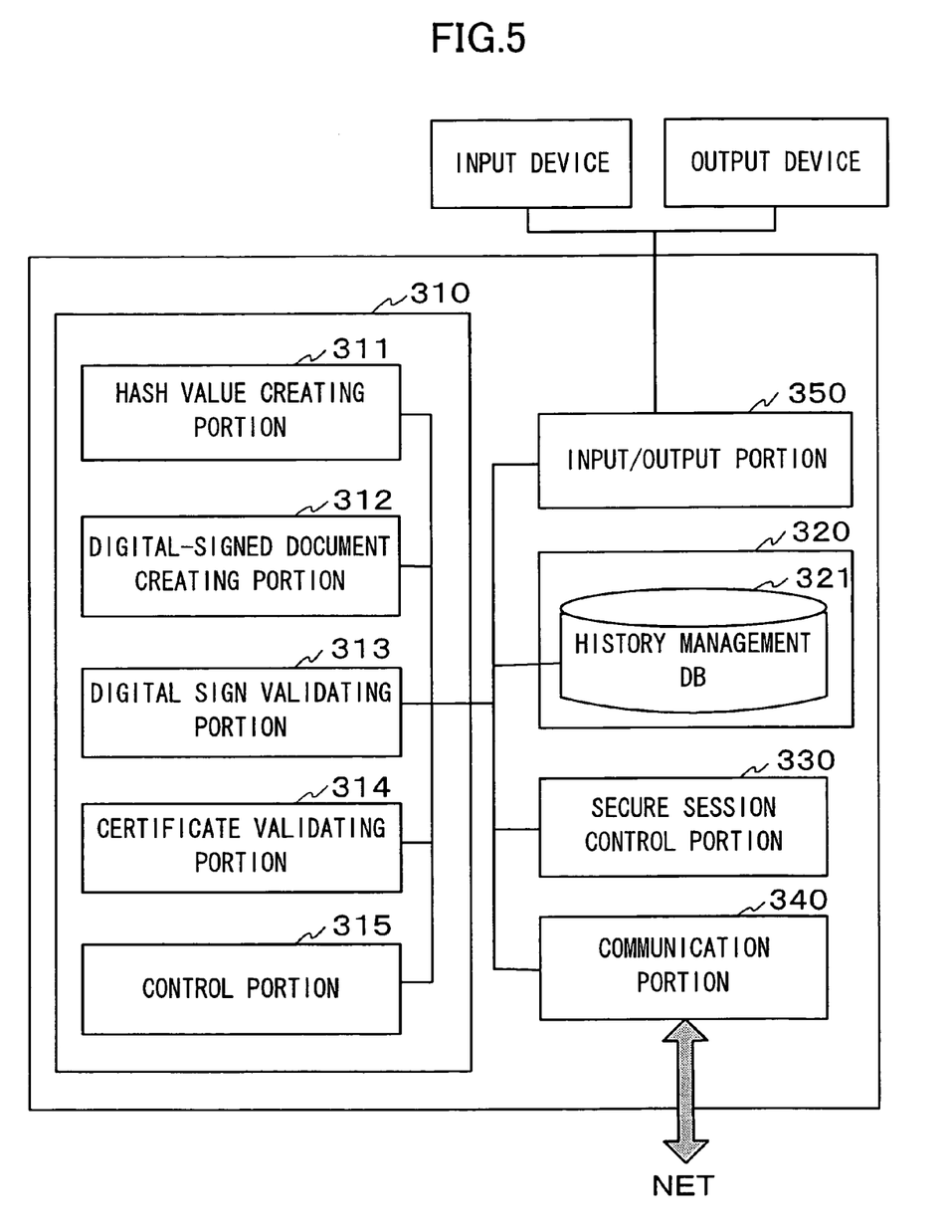
FIG. 5 is a functional configuration diagram of a digital-signed-document exchange supporting server included in the digital-signed document exchanging system in FIG. 1.

FIG. 5 is a functional configuration diagram of the digital-signed-document exchange supporting server 30.

The digital-signed-document exchange supporting server 30 implements a storage portion 320, a communication portion 340, a secure session control portion 330, a processing portion 310, and an input/output portion 350. The storage portion 320 stores a history management database 321 managing sign history information and validation history information. The communication portion 340 communicates with another information processor via the network NET. The secure session control portion 330 performs processing (such as authentication and encryption of a communication path) for securing the security of data to be exchanged with another information processor on the network. The processing portion 310 performs sign creating processing and sign validating processing, which will be described later, in accordance with a request from another information processor on the network. The input/output portion 350 controls an input device and an output device.

The processing portion 310 includes a digest value creating portion 311, a digital-signed document creating portion 312, a digital sign validating portion 313, a certificate validating portion 314 and a control portion 315. The digest value creating portion 311 calculates a digest value from a message to be signed included in a sign request message from a document creating device. The digital-signed-document creating portion 312 creates a digital-signed document by using data (including a sign value, a public key certificate and a message to be signed) from a document creating device. The digital sign validating portion 313 validates an XML sign in accordance with a sign validation requesting message from a sign validating device. The certificate validating portion 314 validates a public key certificate attached to a digital-signed document. The control portion 315 controls these components.

Figure 6:
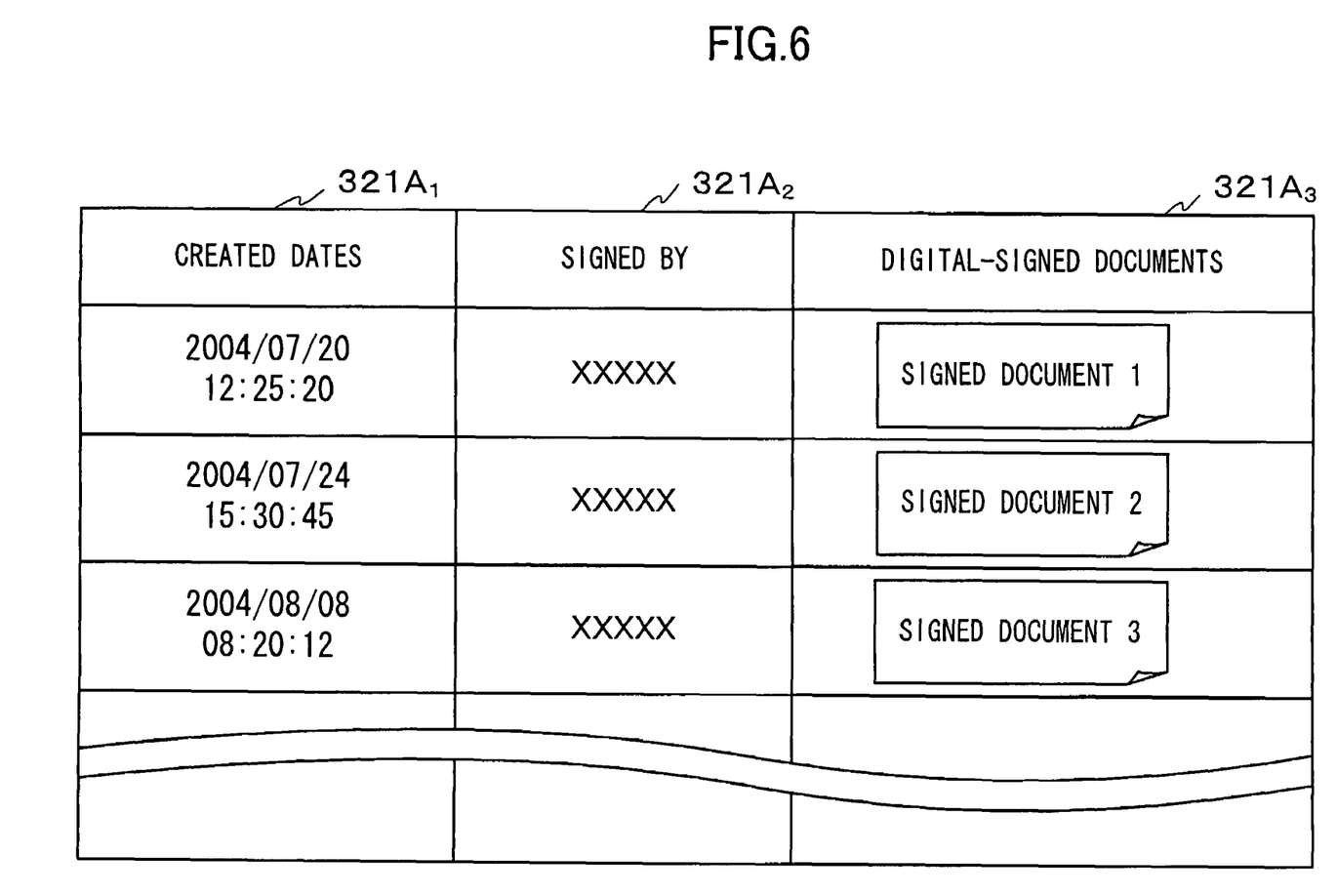
FIG. 6 is a diagram schematically showing a data structure example of a sign history table.
Figure 7:
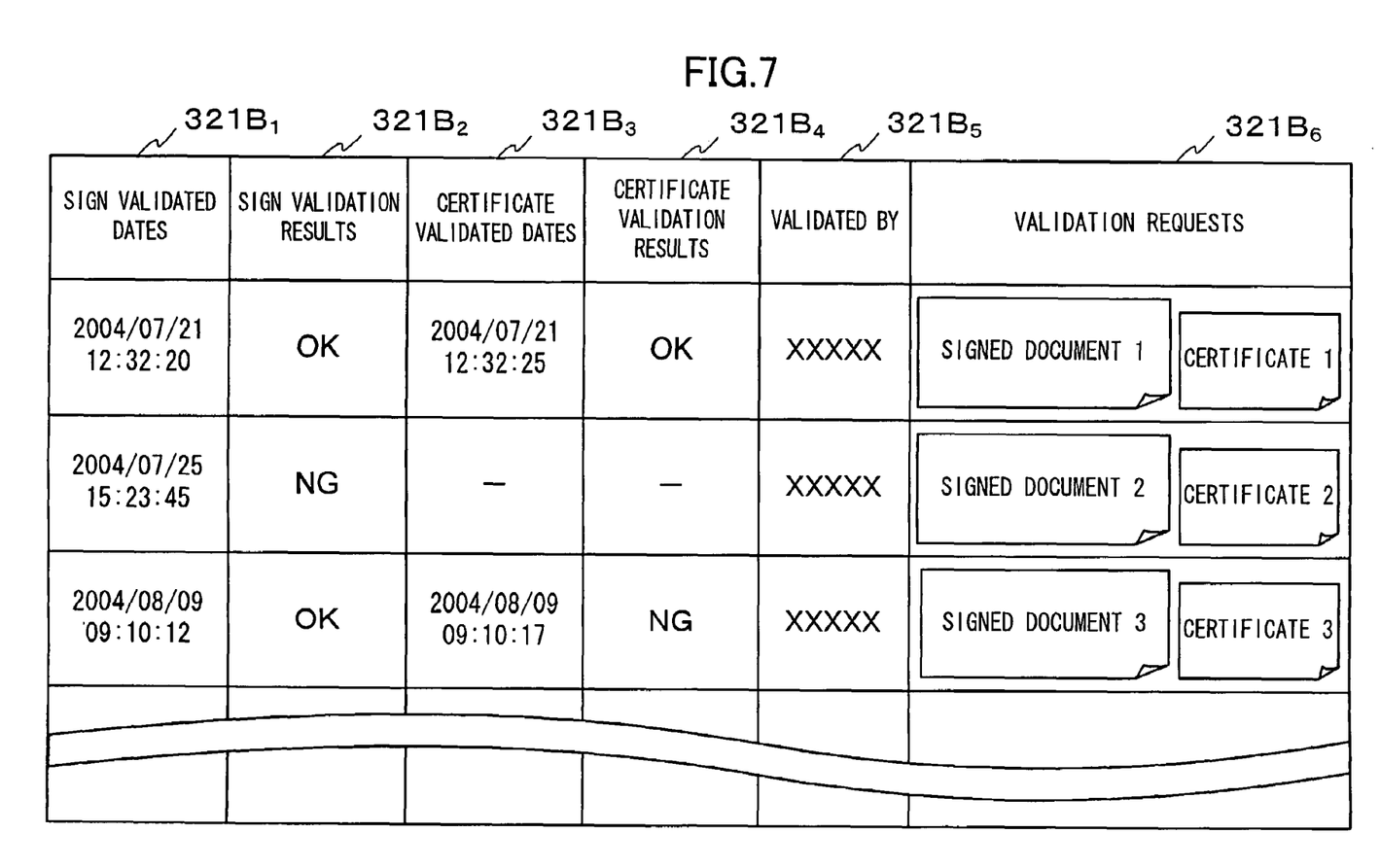
FIG. 7 is a diagram schematically showing a data structure example of a validation history management table.

The history management database 321 includes a sign history management table with which sign history information is registered or validation history management table storing validation history information. As shown in FIG. 6, for each created digital-signed document, created date information $321A_1$, identification information $321A_2$ of a signer or a device used by the signer and digital-signed document data $321A_3$ are registered with the sign history management table. On the other hand, as shown in FIG. 7, for each validated digital-signed document, validated date information $321B_1$ of a sign, information $321B_2$ indicating a result from validation of a sign (here, the string "OK" indicating a success in validation or the string "NG" indicating a fail invalidation), validated date information $321B_3$ of a certificate, information $321B_4$ indicating a result of validation relating to the validity of a certificate (here, the string "OK" indicating the validity or the string, "NG" indicating the invalidity), identification information $321B_5$ of a validator or a device of the validator, and digital-signed document data $321B_6$ are registered with the validation history management table.

Under this functional configuration, the digital-signed-document exchange supporting server 30, in accordance with a request from one of the document creating devices, adds a digital sign to a digital document created by the document creating device and, in accordance with a request from one of the document validating devices, validates a digital sign of a digital-signed document from the document validating device.

Next, processing to be performed in the digital-signed-document exchanging system will be described.

The processing to be performed in the digital-signed-document exchanging system of this embodiment includes digital-signed-document creating processing (1) and digital-signed-document validating processing (2), which will be described below.

(1): digital-Signed-Document Creating Processing

Figure 8:
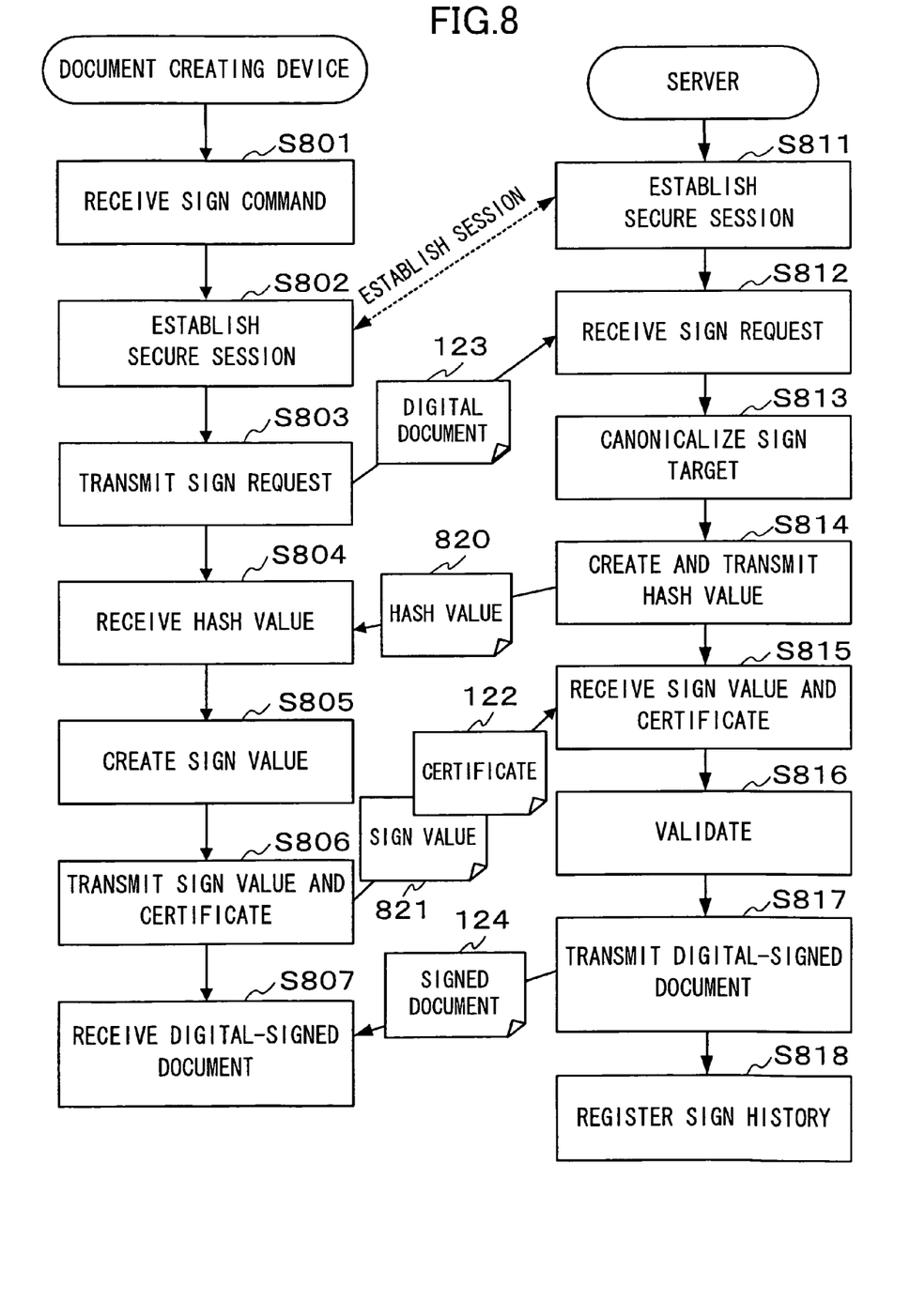
FIG. 8 is a flowchart of processing for creating a digital-signed document to be performed in the digital-signed-document exchanging system according to the embodiment of the invention.

FIG. 8 is a flowchart of processing for creating a digital-signed document to be performed between the digital-signed-document exchange supporting server 30 and one (determined as 10k) of the document creating devices.

When a user inputs a command for an XML sign to an input device in the document creating device 10k, the input/output portion 150 gives the command to the control portion 114. The control portion 114 commands the secure session control portion 130 to establish a session with the digital-signed-document exchange supporting server 30 in accordance therewith (S101).

In accordance with the command, the secure session control portion 130 transmits a secure session establishment request to the digital-signed-document exchange supporting server 30 through the communication portion 140. Thus, mutual authentication and encryption of a communication path are performed by the secure session control portion 130 in the document creating device 10k and the secure session control portion 330 in the digital-signed-document exchange supporting server 30 so that a secure session can be established between the document creating device 10k and the digital-signed-document exchange supporting server 30 (S802 and S811). Thus, the security of information to be exchanged from this point can be established between the document creating device 10k and the digital-signed-document exchange supporting server 30.

After the secure session is established in this way, the sign request message creating portion 111 in the document creating device 10k loads a digital document 123 to be signed from the storage portion 120 and creates a sign request message including the digital document. Furthermore, the communication portion 140 transmits the sign request message to the digital-signed-document exchange supporting server 30 in accordance with a command from the control portion 111 (S803).

In the digital-signed-document exchange supporting server 30, when the communication portion 340 receives the sign request message, the control portion 315 first extracts the digital document 123 to be signed from the XML sign request message and gives the extracted digital document 123 to the digest value creating portion 311.

Next, the digest value creating portion 311 converts the digital document 123 to XML form and canonicalizes the result by a predetermined canonicalizing method (S813) and calculates a hash value of the canonicalized digital document. Then, the control portion 315 commands the communication portion 340 to return the resulting hash value. In accordance with the command, the communication portion 340 returns the hash value to the document creating device 10k as a digest value 820 of the digital document 123 to be signed (S814).

The communication portion 140 of the document creating device 10k receives the digest value 820 and then transmits the received digest value 820 to the control portion 114 (S804). Then, the control portion 114 commands the digital sign creating portion 112 to create a sign value from the digest value 820. In accordance therewith, the digital sign creating portion 112 loads a private key 121 from the storage portion 120 and encrypts the digest value 820 with the private key. Thus, a sign value is created (S805). Here, while the digest value is encrypted by the document creating device, the digital-signed-document exchange supporting server 30 may perform the processing if the private key of the document creating device 10k can be transmitted to the digital-signed-document exchange supporting server 30.

Then, the control portion 114 loads a public key certificate 122 corresponding to the private key 121 used for the creation of the sign value from the storage portion 120 and transmits the sign value 821 along with the public key certificate 122 to the digital-signed-document exchange supporting server 30 through the communication portion 140 (S806).

In the digital-signed-document exchange supporting server 30, when the communication portion 340 receives the sign value 821 and public key certificate 122 from the document creating device (S815), the control portion 314 gives the received sign value 821 and public key certificate 122 to the digital sign validating portion 313. In accordance therewith, the digital sign validating portion 313 validates the sign value 821 (S816). More specifically, the digital sign validating portion 313 decrypts the sign value 821 with the public key within the public key certificate 122 and compares the resulting value and the digest value 820 created in step S814. If the values agree as a result, the sign value 821 is a digital sign by the document creating device having sent the sign request message. In other words, a success in validation of the digital sign is determined. If the values do not agree, the sign value 821 is not a digital sign by the document creating device having sent the sign request message. In other words, a fail in validation of the digital sign is determined.

If the validation of the digital sign succeeds, the digital-signed document creating portion 312 creates a digital-signed document by combining the digital document 123 to be signed, the digest value 820 and the public key certificate 122. Then, the control portion 315 returns the digital-signed document to the document creating device 10k through the communication portion 340 (S817). On the other hand, when the validation of the digital sign fails, the control portion 315 returns a message indicating the fact to the document creating device 10k through the communication portion 340.

Then, the control portion 315 registers correspondence information among the digital-signed document 321A$_3$ returned here, the created date 321A$_1$ and the identification information 321A$_2$ of the destination document creating device 10k with the sign history management table (see FIG. 6) in the history management database 321 as sign history information (S807).

When the communication portion 140 of the document creating device 10k receives the digital-signed document from the digital-signed-document exchange supporting server 30, the control portion 114 stores the digital-signed document 124 in the storage portion 120 and commands the document analyzing portion 113 to display the digital-signed document 124. Finally, in accordance with the command, the document analyzing portion 113 analyzes the digital-signed document and outputs the analysis result to an output device through the input/output portion 150 (S808).

Here, when a user inputs to an input device a command for transmitting the digital-signed document to a sign validating device (such as the sign validating device 20k), the input/output portion 150 gives the command to the control portion 114. In accordance therewith, the control portion 114 loads the digital-signed document 124 from the storage portion 120 and sends the loaded document to the selected sign validating device 20k through the communication portion 140.

(2) digital-Signed-Document Validating Processing

Figure 9:
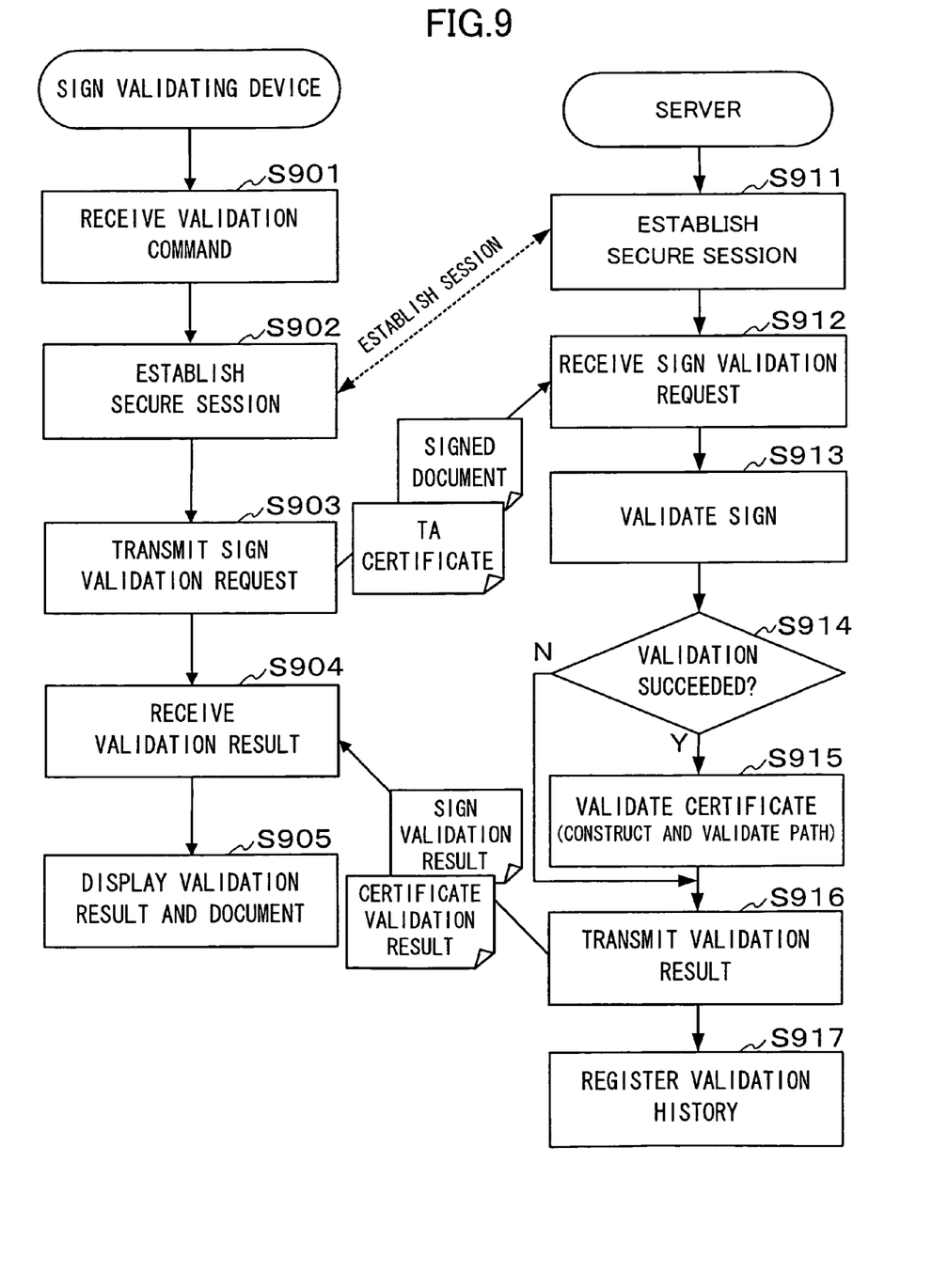
FIG. 9 is a flowchart of processing for validating a digital-signed document to be performed in the digital-signed-document exchanging system according to the embodiment of the invention.

FIG. 9 is a flowchart of processing for validating a digital-signed document to be performed between the digital-signed-document exchange supporting server 30 and the sign validating device 20k having received the digital-signed document from a document creating device.

In the sign validating device 20k having received the digital-signed document from a document creating device, when a user inputs a command for validating an XML sign to an input device, the input/output portion 250 gives the command to the control portion 213. The control portion 213 commands the secure session control portion 230 to establish secure session with the digital-signed-document exchange supporting server 30 in accordance with the command (S901).

In accordance with the command, the secure session control portion 230 transmits a secure session establishment request to the digital-signed-document exchange supporting server 30 through the communication portion 240. Thus, mutual authentication and encryption of a communication path are performed by the secure session control portion 230 in the sign validating device 20k and the secure session control portion 330 in the digital-signed-document exchange supporting server 30 so that a secure session can be established between the sign validating device 20k and the digital-signed-document exchange supporting server 30 (S902 and S911). Thus, the security of the information to be exchanged from this point can be established between the sign validating device 20k and the digital-signed-document exchange supporting server 30.

After the secure session is established, the control portion 213 in the sign validating device 20k commands the sign validation request message creating portion 211 to create a sign validation request message. In accordance with the command, the sign validation request message creating portion 211 loads the digital-signed document 221 to be validated, the public key certificate 223 and the TA certificate 222 from the storage portion 220 and creates a sign validation request message including them. Then, the control portion 213 transmits the sign validation request message created by the sign validation request message creating portion 211 to the digital-signed-document exchange supporting server 30 through the communication portion 240 (S903).

In the digital-signed-document exchange supporting server 30, when the communication portion 340 receives the sign validation request message, the control portion 315 extracts the digital-signed document, public key certificate and TA certificate from the sign validation request message and gives them to the digital sign validating portion 313 (S912). In accordance therewith, the digital sign validating portion 313 canonicalizes an XML document within the digital-signed document first, calculates the hash value (digest value) and then decrypts a sign value of the digital-signed document with the public key included in the public key certificate. Furthermore, the digital sign validating portion 313 compares the digest value resulting from the calculation, and the value resulting from the decryption of the sign value so that the sign of the digital-signed document can be validated (S913).

As a result, if the digital sign validating portion 313 determines that the values do not agree, that is, that the sign validation fails (S914), the certificate validating portion 340 controls the communication portion 315 to return the validation result, "FAILED", to the sign validating device 20k as a return message to the sign validation request (S915).

On the other hand, if the digital sign validating portion 313 determines that the values agree, that is, that the sign validation succeeds (S914), the certificate validating portion 314 validates the public key certificate used for the sign validation. Thus, in the digital-signed-document exchange supporting server 30, the validity of the public key used for the sign validation can be further checked. More specifically, the certificate validating portion 314 establishes and validates an authentication path from the trust anchor (TA certificate) to a target certificate (the public key certificate to be validated). More specifically, the digital-signed-document exchange supporting server obtains certificates on the authentication path and the invalidity information (CRL/ARL) relating thereto sequentially from a directory server provided by a certificate authority and, at the same time, validates whether the certificates are invalid or not. Alternatively, certificate validation requests may be transmitted to a server which validates a certificate on behalf (called certificate validating server, hereinafter) and may receive the validation results so that an authentication path from a TA certificate to a public key certificate thereof can be established and validated.

If the validity of the public key used for the sign validation is determined as a result, the certificate validating portion 314 gives a command to the communication portion 340 so that the sign validation result, "SUCCEEDED", and the public key certificate validation result, "VALID", can be transmitted to the sign validating device 20k as a return message to the sign validation request (S915).

Thus, when the return message to the sign validation request message is transmitted, the control portion 213 registers, as the validation history information, sign validated date information $321B_1$, information indicating the sign validation result ("OK" or "NG") $321B_2$, certificate validated date information $321B_3$, information indicating a validation result relating to the validity of a certificate ("OK" or "NG") $321B_4$, identification information of a validator or a device used by the validator (here, identification information of the sign validating device 20k) $321B_5$, and a digital-signed document $321B_6$ transmitted to the digital-signed-document exchange supporting server 30 in step S903 with the validation history management table (see FIG. 7) of the history management database 321 (S916).

In the sign validating device 20k, when the communication portion 40 receives the return message from the digital-signed-document exchange supporting server 30 (S904), the control portion 213 extracts the validation result (that is, the sign validation result and the validity of the public key certificate or the sign validation result) from the return message and displays it on an output device through the input/output portion 250. When a user inputs a command for displaying the digital-signed document to the input device here, the input/output portion 250 gives the command to the control portion 213. In accordance therewith, the control portion 213 loads the digital-signed document 221 from the storage portion 120 and commands the analysis to the input/output portion 250. In accordance therewith, the document analyzing portion 212 analyzes the document data of the digital-signed digital document 221 and causes an output device to display the analysis result through the input/output portion 250 (S905).

The digital-signed document creating processing (1) and digital-signed document validating processing (2) can implement canonicalizing processing before a digital sign is created and canonicalizing processing before the sign is validated in a common digital-signed-document exchange supporting server. Thus, a difference due to a difference in methods of implementing canonicalizing processing can be prevented between a result of canonicalization of a digital document with a digital sign to be validated and a result of canonicalization of a digital document when the digital sign is created. Therefore, a digital sign can be securely validated for an XML document requiring canonicalization for creation and validation of a digital sign, for example. When a new standard specification is adopted, the digital-signed-document exchange supporting server only needs to be compliant with the new standard specification so that the management load on each user can be reduced. Furthermore, since, according to this embodiment, the digital-signed-document exchange supporting server manages a sign history and a sign validation history, an information processor on the network can use history information common to jobs such as creation of a seal record book.

While an XML document has been described above as a digital document to be signed for example, the digital-signed-document exchanging system according to this embodiment may add a sign to any digital document as far as the digital document is a digital document to undergo canonicalizing processing both before signed and before validated.

While the document creating device and sign validating device are implemented by different information processors above, one information processor may have the functions of both of the document creating device and sign validating device.

While the description above assumes the case that the function of the document creating device is implemented by one information processor, the function of the document creating device may be distributed to multiple information processors. For example, as shown in FIG. 1, a document creating system 10Z to perform the series of steps S801 to S807 in FIG. 8 may be constructed by connecting the information processor (sign creating device) 12 to perform the steps S804 to S806 in FIG. 8 and the information processor (sign requesting device) 11 to perform the steps S801 to S803 and S807 via a LAN, for example. In this case, the sign requesting device and sign creating device need not be placed physically in a same place.

While a digital-signed document is created by combining a digital document, a sign value and a public key certificate in the description above, other information may be added to the signed document as required. For example, when multiple digital-signed-document exchange supporting servers exist, identification information (such as an FQDN, URI and IP addresses of the server) of the digital-signed-document exchange supporting servers may be further included in the digital-signed document so that a sign validating device can search the digital-signed-document exchange supporting server to which a sign validation request message is to be transmitted based on the identification information.

Other processing may be performed by the digital-signed-document exchange supporting server. For example, processing for encrypting an XML document itself and processing for decrypting an encoded message of the XML document may be performed thereby. In order to do so, encryption keys used for encryption and decryption needs to be shared by a document creating device, a digital-signed-document exchange supporting server and a sign validating device.

The specification and drawings are, accordingly, to be regarded in an illustrative rather than a restrictive sense. It will, however, be evident that various modifications and changes may be made thereto without departing from the spirit and scope of the invention as set forth in the claims.

We claim:

1. An information processor for supporting an exchange of a digital-signed digital document, the processor comprising:
   communication means connected to a network; and
   processing means for, when the communication means receives a sign request including a first digital document from a first computer on the network, canonicalizing the first digital document by a method of implementing a canonicalization process, calculating a digest value of the canonicalized first digital document, and causing the communication means to output the digest value to the first computer,
   wherein the processing means is further adapted to perform the steps of:

when the communication means receives a sign request including a second digital document from a second computer on the network, canonicalizing the second digital document by the same method of implementing the canonicalization process, calculating a digest value of the canonicalized second digital document, and causing the communication means to output the digest value to the second computer, and when the communication means receives from one of the first and second computers on the network a validation request including a public key for validating a digital document with a digital sign and the digital document with the digital sign has been received from the other one of the first and second computers, canonicalizing the digital document by the same method of implementing the canonicalization process, calculating a digest value of the canonicalized digital document, comparing a value obtained by decrypting the digital sign with the public key and the calculated digest value, and causing the communication means output the result of the comparison to the computer which sent the validation request.

2. The processor of claim 1, wherein the processing means is adapted, when the validation request includes a self-sign certificate of a certificate authority, to validate the public key by using the self-sign certificate as a trust anchor.

3. The processor of claim 1, comprising:

storage means for storing sign validation history information, wherein the processing means is adapted, when a value obtained by decrypting the digital sign and a digest value of the second digital document are compared, to store, as the sign validation history information, information including the second digital document with the digital sign, a result of the comparison and identification information of the second computer in the storage means.

4. The processor of claim 1, comprising:

storage means for storing sign history information, wherein the processing means is adapted, when the first digital document with the digital sign is calculated, to store, as the sign history information, information including the first digital document with the digital sign and identification information of the first computer in the storage means.

5. The processor of claim 1, comprising:

storage means for storing a digital document to be canonicalized before a digital sign thereof is created; and input receiving means for receiving a command for adding a digital sign to the digital document;

wherein the processing means for, when the input receiving means receives the command for adding, causing the communication means to output a sign request including the digital document to a server on the network, when the communication means receives a digest value of the digital document from the server, creating the digital sign by encrypting the digest value and cause the communication means to output the digital sign to the server, and, when the communication means receives the digital document with the digital sign created from the digital sign and the digital document from the server, storing the digital document with the digital sign in the storage means.

6. The processor of claim 1, comprising:

storage means which stores a digital document with a digital sign;

input receiving means which receives an input of a command for validating the digital sign; and control means for, when the input receiving means receives an input of the command for validating, causing the communication means to output a validation request including the digital document with the digital sign and a public key for validating the digital sign to a server on the network, and, when the communication means receives a result of a comparison between a digest value of the digital document and a value obtained by decrypting the digital sign with the public key, outputting the result of the comparison.

7. A digital-signed digital document exchange supporting method in which a server having communication means connecting to a network and processing means supports an exchange of a digital document with a digital sign on the network in calculating a digest value of a digital document, the method comprising the steps of:

when the communication means receives a sign request including a first digital document from a first computer on the network, canonicalizing the first digital document by a method of implementing a canonicalization process, calculating a digest value of the canonicalized first digital document, and causing the communication means to output the digest value to the first computer, when the communication means receives a sign request including a second digital document from a second computer on the network, canonicalizing the second digital document by the same method of implementing the canonicalization process, calculating a digest value of the canonicalized second digital document, and causing the communication means to output the digest value to the second computer, and when the communication means receives from one of the first and second computers on the network a validation request including a public key for validating a digital document with a digital sign and the digital document with the digital sign has been received from the other one of the first and second computers, canonicalizing the digital document by the same method of implementing the canonicalization process, calculating a digest value of the canonicalized digital document, comparing a value obtained by decrypting the digital sign with the public key and the calculated digest value, and causing the communication means to output the result of the comparison to the computer which sent the validation request.

8. The method of claim 7, comprising the step of, when the validation request includes a self-sign certificate of a certificate authority, validating the public key by using the self-sign certificate as a trust anchor by the processing means.

9. A computer-readable storage medium having a program embodied thereon, the program, when implemented by a computer server, controls the server to perform the method steps of claim 7.

* * * * *